(12) United States Patent
Nam et al.

(10) Patent No.: US 11,586,871 B2
(45) Date of Patent: Feb. 21, 2023

(54) METAL CARD AND CARD MANUFACTURING METHOD

(71) Applicants: Kona I Co., Ltd., Seoul (KR); Kona M Co., Ltd., Chungcheongbuk-do (KR)

(72) Inventors: Ki sung Nam, Chungcheongbuk-do (KR); Han seon Kim, Chungcheongbuk-do (KR); Suk Ku Lee, Seoul (KR)

(73) Assignees: KONA I CO., LTD., Seoul (KR); KONA M CO., LTD., Chungcheongbuk-Do (KR)

( * ) Notice: Subject to any disclaimer, the term of this patent is extended or adjusted under 35 U.S.C. 154(b) by 142 days.

(21) Appl. No.: 17/254,711

(22) PCT Filed: Jun. 19, 2018

(86) PCT No.: PCT/KR2018/006930
§ 371 (c)(1),
(2) Date: Dec. 21, 2020

(87) PCT Pub. No.: WO2019/245069
PCT Pub. Date: Dec. 26, 2019

(65) Prior Publication Data
US 2021/0271950 A1    Sep. 2, 2021

(51) Int. Cl.
*G06K 19/077* (2006.01)
*B32B 3/26* (2006.01)
(Continued)

(52) U.S. Cl.
CPC ........ *G06K 19/07722* (2013.01); *B32B 3/266* (2013.01); *B32B 7/12* (2013.01);
(Continued)

(58) Field of Classification Search
CPC ...... G06K 19/07722; B32B 3/266; B32B 7/12
(Continued)

(56) References Cited

U.S. PATENT DOCUMENTS

2018/0339503 A1* 11/2018 Finn ................ G06K 19/07722
2019/0005372 A1*  1/2019 Virostek .......... G06K 19/07771
(Continued)

FOREIGN PATENT DOCUMENTS

JP    2006-174223 A    6/2006
JP    2017-524171 A    8/2017
(Continued)

*Primary Examiner* — Allyson N Trail
(74) *Attorney, Agent, or Firm* — Bridgeway IP Law Group, PLLC; Sang Ho Lee; Hyun Woo Shin

(57) ABSTRACT

The present invention relates to a metal card and a card manufacturing method, and the metal card includes a metal sheet, a machined part made of a plastic material in such a manner as to be inserted into one side surface of the metal sheet, an insulating sheet with a ferromagnetic insulating material in such a manner as to be attached to the underside of the metal sheet, and an inlay sheet with antenna coils in such a manner as to be attached to the underside of the insulating sheet, wherein the metal sheet has a machined part insertion portion formed on one side surface thereof to insert the machined part, and the ferromagnetic insulating material has the shape of one or more pieces or powder.

14 Claims, 7 Drawing Sheets

(51) Int. Cl.
B32B 7/12 (2006.01)
B32B 15/16 (2006.01)

(52) U.S. Cl.
CPC ........ B32B 15/16 (2013.01); *B32B 2307/206* (2013.01); *B32B 2307/208* (2013.01); *B32B 2425/00* (2013.01)

(58) Field of Classification Search
USPC ......................................................... 235/493
See application file for complete search history.

(56) References Cited

U.S. PATENT DOCUMENTS

| | | | | |
|---|---|---|---|---|
| 2021/0192312 | A1* | 6/2021 | Lotya | ................. H01Q 7/00 |
| 2022/0051064 | A1* | 2/2022 | Lowe | ................. B42D 25/373 |

FOREIGN PATENT DOCUMENTS

| | | | |
|---|---|---|---|
| KR | 20-0382725 | Y1 | 4/2005 |
| KR | 10-2012-0127914 | A | 11/2012 |
| KR | 10-2013-0006358 | A | 1/2013 |
| KR | 10-2013-0051862 | A | 5/2013 |
| KR | 10-2015-0105513 | A | 9/2015 |
| KR | 10-2018-0020097 | A | 2/2018 |

* cited by examiner

METAL CARD AND CARD MANUFACTURING METHOD

TECHNICAL FIELD

The present invention relates to a card manufacturing method and a metal card, and more particularly, to a card manufacturing method and a metal card that are capable of providing a ferrite material constituting an insulating sheet in various shapes, thereby enhancing insulation performance and achieving an improvement in the operation of the metal card.

BACKGROUND ART

Generally, credit cards are used instead of cash, and as the credit cards are recently developed into smart cards in which IC chips capable of storing a large quantity of information are embedded, they are dynamically utilized as all kinds of membership cards as well as payment cards. In such smart card markets, further, special cards made of various materials have been developed. In particular, credit cards made of a differentiated metal material have been provided to VIP customers, and as the metal cards can express inherent metallic luster, they can become high-level credit cards, so that they are provided to special customers.

In case of such conventional metal cards, however, at the time of contactless communication to a reader it is hard to operate antennas because of the characteristics of the metal, so that they are often restricted in using an RF function, ATM, and so on. Further, the conventional metal cards are made of a thin film type metal sheet or thin sheet coated with metal powder, thereby making it difficult to print patterns and characters on their surface, and contrarily, if the metal cards are made of a relatively lightweight material, a weight the metal has cannot be transferred to the metal cards. Accordingly, there is a need to develop a novel metal card capable of overcoming such limitations in use and expressing specific weight and beauty of the metal material.

A conventional metal thin film plastic card is disclosed in Korean Utility Model Registration No. 20-0382725, which includes a core sheet 13 made of a synthetic resin, metal thin films 12 attached to the top and underside of the core sheet 13 to a size smaller than the core sheet 13, margins 13a formed on the top and underside edges of the core sheet 13, and antenna coils 21 disposed along the margins 13a. In case of the conventional metal thin film plastic card, however, the metal films are disposed on a portion of the center of the card to prevent the antenna coils from coming into contact therewith, thereby causing the whole outer appearance thereof to look bad and making it hard to express the metal texture on the whole surface of the card.

DISCLOSURE

Technical Problem

Accordingly, the present invention has been made in view of the above-mentioned problems occurring in the related art, and it is an object of the present invention to provide a metal card manufacturing method and a metal card that are capable of performing a plastic machining process in a metal sheet.

It is another object of the present invention to provide a metal card manufacturing method and a metal card that are capable of providing a ferrite material with various shapes to improve sensitivity of antenna coils, thereby solving the existing problem that it is impossible to perform RF communication because of material characteristics of a metal sheet.

Technical Solution

To accomplish the above-mentioned objects, according to one aspect of the present invention, there is provided a metal card including a metal sheet, a machined part made of a plastic material in such a manner as to be inserted into one side surface of the metal sheet, an insulating sheet with a ferromagnetic insulating material in such a manner as to be attached to the underside of the metal sheet, and an inlay sheet with antenna coils in such a manner as to be attached to the underside of the insulating sheet, wherein the metal sheet has a machined part insertion portion formed on one side surface thereof to insert the machined part, and the ferromagnetic insulating material has the shape of one or more pieces or powder.

Desirably, the ferromagnetic insulating material is a ferrite. Further, the metal sheet has the machined part insertion portion formed on one side surface thereof to insert the machined part thereinto and a first opening formed on an opposite side surface to one side surface thereof to expose a portion of the machined part therethrough, a portion of the machined part and portions of sheets laminated onto the underside of the metal sheet are cut through the first opening in a first milling process to allow the antenna coils of the inlay sheet to be exposed to the outside, and the antenna coils are connected to a COB (Chip-On-Board) pad so that the COB pad connected to the antenna coils is attached onto the first opening of the metal sheet. Furthermore, the inlay sheet is subjected to a second milling process in which a portion thereof is cut to insert the COB pad thereinto and has an accommodation recess adapted to accommodate a protruding portion from the underside surface of the COB pad.

According to another embodiment of the present invention, the metal card further includes one or more adhesive sheets as hot melt sheets for attaching the insulating sheet, so that the adhesive sheets are melted at a high temperature and are attachedly penetrated into one or more pieces of the ferromagnetic insulating material.

Further, the metal card further includes: a primer sheet applied to the metal sheet to which the COB pad is attached; a printed sheet formed on the metal sheet to which the primer sheet is applied so as to print card information; and a coated sheet formed on the metal sheet on which the card information is printed so as to coat the metal sheet.

To accomplish the above-mentioned objects, according to another aspect of the present invention, there is provided a card manufacturing method for manufacturing a card with a metal sheet, a machined part, an insulating sheet, and an inlay sheet, the method including the steps of: inserting the machined part made of a plastic material into one surface of the metal sheet to provide the metal sheet with the machined part; attaching the insulating sheet with a ferromagnetic insulating material to the underside of the metal sheet; and attaching the inlay sheet with antenna coils to the underside of the insulating sheet, wherein the metal sheet, the insulating sheet, and the inlay sheet are attached to one another by means of one or more adhesive sheets, and the ferromagnetic insulating material has the shape of one or more pieces.

Advantageous Effects

According to the present invention, the card manufacturing method and the metal card are capable of efficiently connecting the antenna coils and the COB pad through the plastic machining process of the metal sheet, thereby enhancing the operational efficiency of the COB pad. According to the present invention, moreover, the card manufacturing method is carried out by directly connecting the antenna coils to the COB pad in the state where the antenna coils are not brought into contact with the metal sheet, thereby manufacturing the metal card capable of keeping the characteristics of the metal material and improving a contactless communication function. Specifically, the COB pad and the antenna coils are directly connected to each other, while the top surface of the metal card is being made of the metal material, so that unlike the existing metal card, wireless communication sensitivity is improved and no interference between the metal material and the antenna coils occurs.

According to the present invention, also, the card manufacturing method is carried out by providing the ferrite material as a ferromagnetic insulating material in various shapes so as to improve insulating properties and adhesion, thereby accomplishing efficient adhesion of the insulating sheet to other sheets and minimizing the interferences between the antennas and the metal material to thus optimize RF communication sensitivity.

BRIEF DESCRIPTION OF DRAWINGS

In the attached drawings, the corresponding parts in embodiments of the present invention are indicated by corresponding reference numerals.

MODE FOR INVENTION

Figure 1:
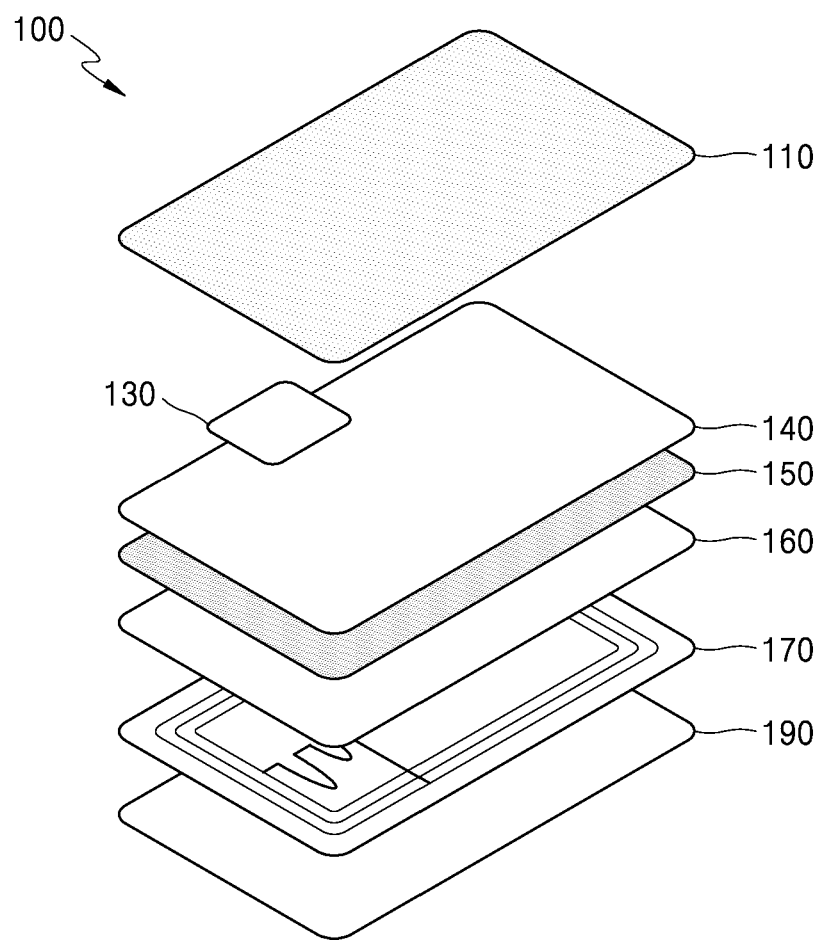
FIG. 1 is a perspective view showing a metal card according to an embodiment of the present invention.

Hereinafter, the present invention will be in detail given with reference to the attached drawings. If it is determined that the detailed explanation on the well known technology related to the present invention makes the scope of the present invention not clear, the explanation will be avoided for the brevity of the description. In the description, it should be noted that the parts corresponding to those of the drawings are indicated by corresponding reference numerals.

In the description, when it is said that one element is described as being "connected" or "coupled" to the other element, one element may be directly connected or coupled to the other element, but it should be understood that another element may be present between the two elements. In the description, further, when it is said that one portion is described as "includes" any component, one element further may include other components unless no specific description is suggested.

Now, embodiments of the present invention will be described in detail below with reference to the accompanying drawings.

FIG. 1 is a perspective view showing a metal card 100 according to an embodiment of the present invention. The metal card 100 largely includes one or more sheets or layers. According to the embodiment of the present invention, the metal card 100 includes a metal sheet 110, a plastic machined part 130, an insulating sheet 150, one or more adhesive sheets 140 and 160, an inlay sheet 170, and a printed sheet 180. In FIG. 1, the metal card 100 includes only the components as mentioned above, but it may further include a coated sheet, a COB pad, and other components, without being limited thereto. Furthermore, the metal card 100 may include a display and a biophysical sensor for implementing additional functions. According to the present invention, further, the metal card 100 is manufactured to a given size and thickness according to predefined standards, and the sizes and thicknesses of the respective sheets are determined optimizedly in consideration of the operation and wireless communication sensitivity of the metal card 100. Furthermore, the sheets constituting the metal card 100 according to the present invention are not the sheets for making one card, but the large-scale sheets for making a plurality of cards so as to achieve mass production of the cards.

The metal sheet 110 is a core sheet expressing special material and weight of the metal card of the present invention and is made of an SUS (Steel Use Stainless) material. The metal material constituting the metal sheet 110 is selected in consideration of materials and weights expressing the characteristics thereof as well as durability, abrasion, and deformation with which machining processes are resistant. According to the embodiment of the present invention, the metal sheet 110 made of the SUS material is strong to corrosion and is thermally treatable.

According to the embodiment of the present invention, the metal sheet 100 is provided to the form of a large-scale sheet on which a plurality of cards are made, and after a laminating process in which a plurality of sheets are made to one sheet, the plurality of cards are produced from one sheet through cutting. According to the characteristics of the metal material, a special machining material, a coolant, and a cutting tool are used to perform the cutting operation for the metal sheet.

The machined part 130 is a piece of sheet made of a plastic material like PVC and is located in a COB pad insertion space of the metal sheet 110. The machined part 130 serves as a device for attaching antenna coils of the inlay sheet 170 to the COB pad in such a manner where the antenna coils are spaced apart from the metal sheet 110 according to the characteristics of the metal card 100. The machined part 130 made of the plastic material is located on a given portion of the metal sheet 110 and is then machined, so that the COB pad can be efficiently connected to the antenna coils, while a direct contact between the metal sheet 110 and the antenna coils is being avoided. This is a machining method for solving the problems the existing metal card has had, and so as to avoid the contact between the metal sheet 110 and the antenna coils, the existing metal card is configured to have the antenna coils located on the plastic sheet in such a manner as to indirectly communicate with the COB pad disposed on the metal sheet. In case of another existing metal card, a portion of the metal sheet is incised to arrange and operate antenna coils thereon. However, such existing metal cards cause the sensitivity of the antenna coils to be deteriorated and provide bad outer appearances.

So as to solve such problems, the metal card 100 according to the present invention is configured to locate the machined part 130 in the COB pad insertion space of the metal sheet 110, so that the antenna coils are brought into direct contact with the COB pad. As a result, the sensitivity of the antenna coils is improved, and the top surface of the metal card is formed with the metal material, thereby providing a high level outer appearance of the metal card and improving wireless communication performance.

The insulating sheet 150 serves to shield an interference with the metal sheet 110 so as to allow the antenna coils of the inlay sheet 170 to be operable. So as to allow NFC antenna coils to operate, the NFC antenna coils have to communicate with the opposite side antenna reader thereto, and in this case, a magnetic field is generated from the antenna coils to allow the antenna coils to be attached to the underside surface of the metal card, so that the antenna coils may be close to the metal material. In this case, the metal material of the metal sheet changes SRF (self-resonant frequency) of the antennal coils to increase loss, so that the inductance of the antenna coils becomes lowered to cause communication troubles. This is because of eddy (eddy current) generated from the metal material by means of the magnetic field, and so as to eliminate the eddy, a high permeability and high resistance material has to be located between the metal and the antenna coils to adjust magnetic field lines. To do this, the insulating sheet 150 is used, which is referred to as a ferrite sheet. A ferrite is made by making iron to the form of powder, oxidizing and insulating the outer surface of the powder, and applying a pressure to make the iron powder to a given desired shape.

The insulating sheet 150 and the metal sheet 110 are bonded to each other by means of the adhesive sheets 140 and 160. According to the embodiment of the present invention, the adhesive sheets 140 and 160 are hot melt sheets. A hot melt material is melted by means of heating, and if a material like a thermoplastic resin is heated, melted and then cooled, it becomes solidified. According to the embodiment of the present invention, when the hot melt sheets are melted at a high temperature, hot melt components are penetrated into the piece-shaped ferrite or the powder-shaped ferrite or are mixed therewith, so that the insulating sheet 150 and the metal sheet 110 are bonded to each other by means of the adhesive sheets 140 and 160, thereby improving adhesion and bonding strength.

The inlay sheet 170 is a sheet having the RF antenna coils, and the number of turns of the antenna coils in the inlay sheet 170 is determined to express optimized sensitivity through an RF communication (for example, NFC) sensitivity test. According to the present invention, further, the antenna coils are directly connected to the COB pad (Chip-On-Board) attached to the metal sheet 110 through the machined part 130.

The printed sheet 190 is a sheet on which card information is printed and displayed, which is attached to the underside surface of the metal card 100. After the machined part 130 is attached to the metal sheet 110 through a first machining process of the metal sheet 110, the sheets 110, 140, 150, 160, 170 and 190 are stackedly laminated onto one another and are then machined to provide one metal card body.

Figure 2:
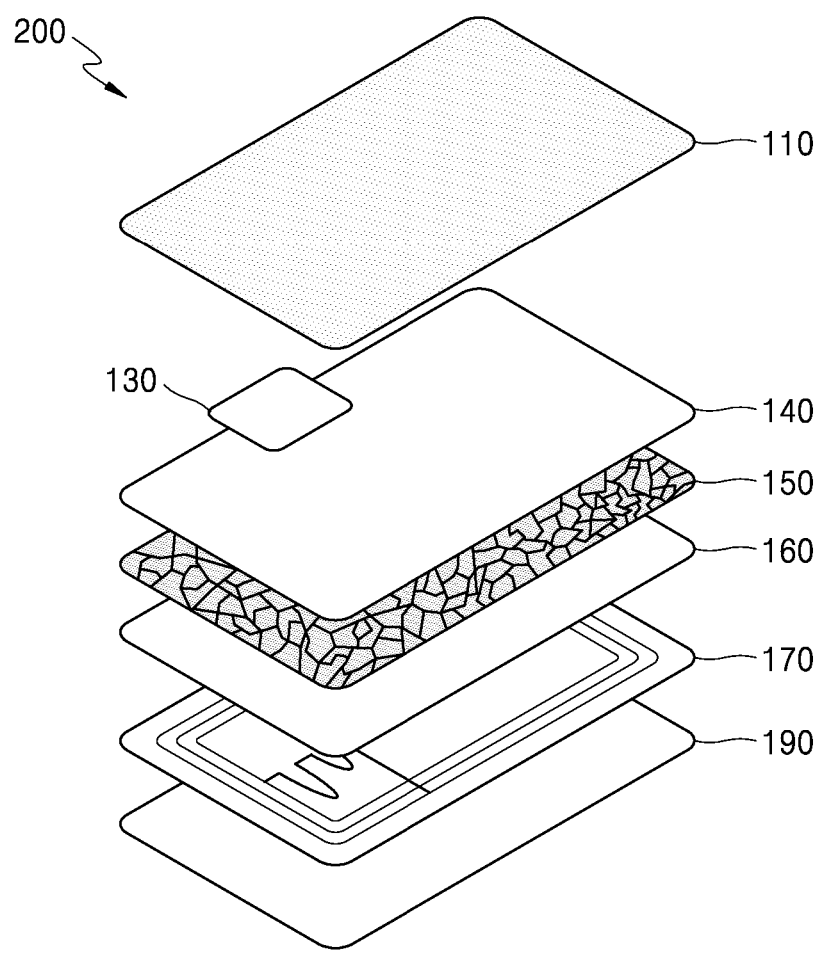
FIG. 2 is a perspective view showing a metal card according to another embodiment of the present invention.

FIG. 2 is a perspective view showing a metal card according to another embodiment of the present invention. The metal card 200 largely includes one or more sheets or layers. According to the present invention, in the same manner as shown in FIG. 1, the metal card 200 includes a metal sheet 110, a plastic machined part 130, an insulating sheet 150, one or more adhesive sheets 140 and 160, an inlay sheet 170, and a printed sheet 190. Without being limited thereto, the metal card 200 may include a display and a biophysical sensor for implementing additional functions.

According to anther embodiment of the present invention, the insulating sheet 150 of the metal card 200 has the shape with one or more broken pieces. For example, the insulating sheet 150 is broken to produce non-uniform or uniform broken pieces. Like this, if the insulating sheet 150 has the shape with broken pieces, the hot melt adhesive is melted to flow to gaps between the pieces of the insulating sheet 150 at the time when the insulating sheet 150 is attached to the adhesive sheets, so that the adhesion force of the insulating sheet 150 can be improved.

Figure 3:
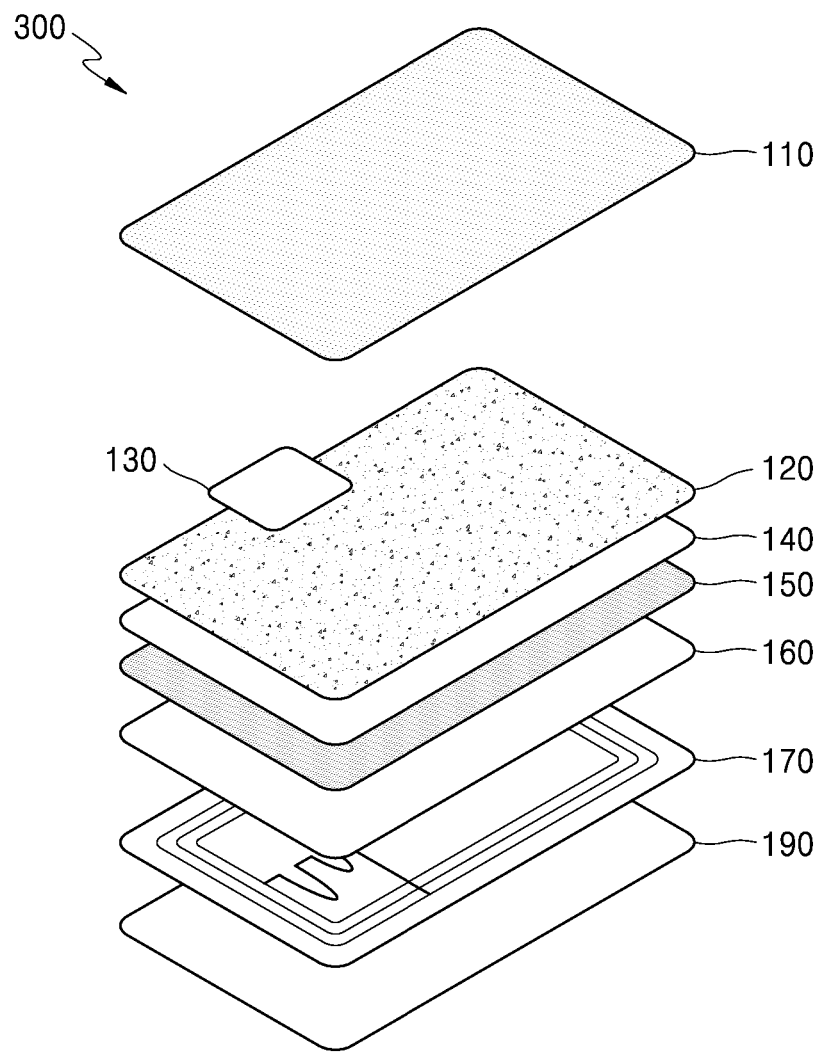
FIG. 3 is a perspective view showing a metal card according to yet another embodiment of the present invention.

FIG. 3 is a perspective view showing a metal card according to yet another embodiment of the present invention. The metal card 300 further includes a powder type ferrite sheet 120, in addition to an insulating sheet 150.

The ferrite is made of a ferromagnetic insulating material, and if the ferrite is powdered, an adhesion force is improved, so that in addition to the insulating sheet 150, another insulating sheet is provided to upgrade insulating functions between the metal sheet 110 and other sheets. According to the present invention, the ferrite is powdered, but of course, it may be made to the form of a net or amorphous powder, without being limited thereto. Since the ferrite is such ferromagnetic insulating material, the ferrite sheet is added to enhance the insulating characteristics on the underside of the metal sheet 110, thereby ensuring normal antenna operations in the metal card 300.

Hereinafter, an explanation on a method for machining the metal sheet 110 and the machined part 130 of the metal card according to the present invention will be in more detail given with reference to FIGS. 4 to 5.

Figure 4:
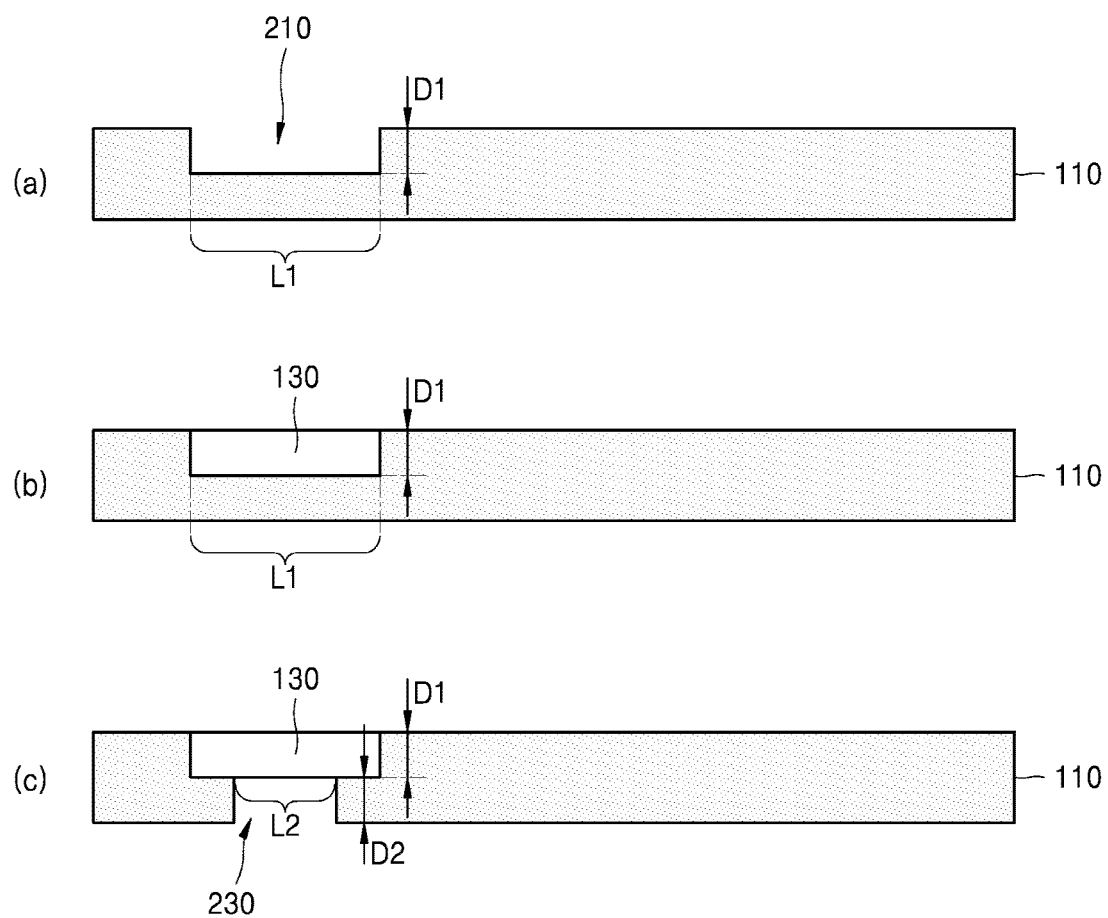
FIGS. 4 to 5 are sectional views showing a metal card manufacturing method according to an embodiment of the present invention.
Figure 5:
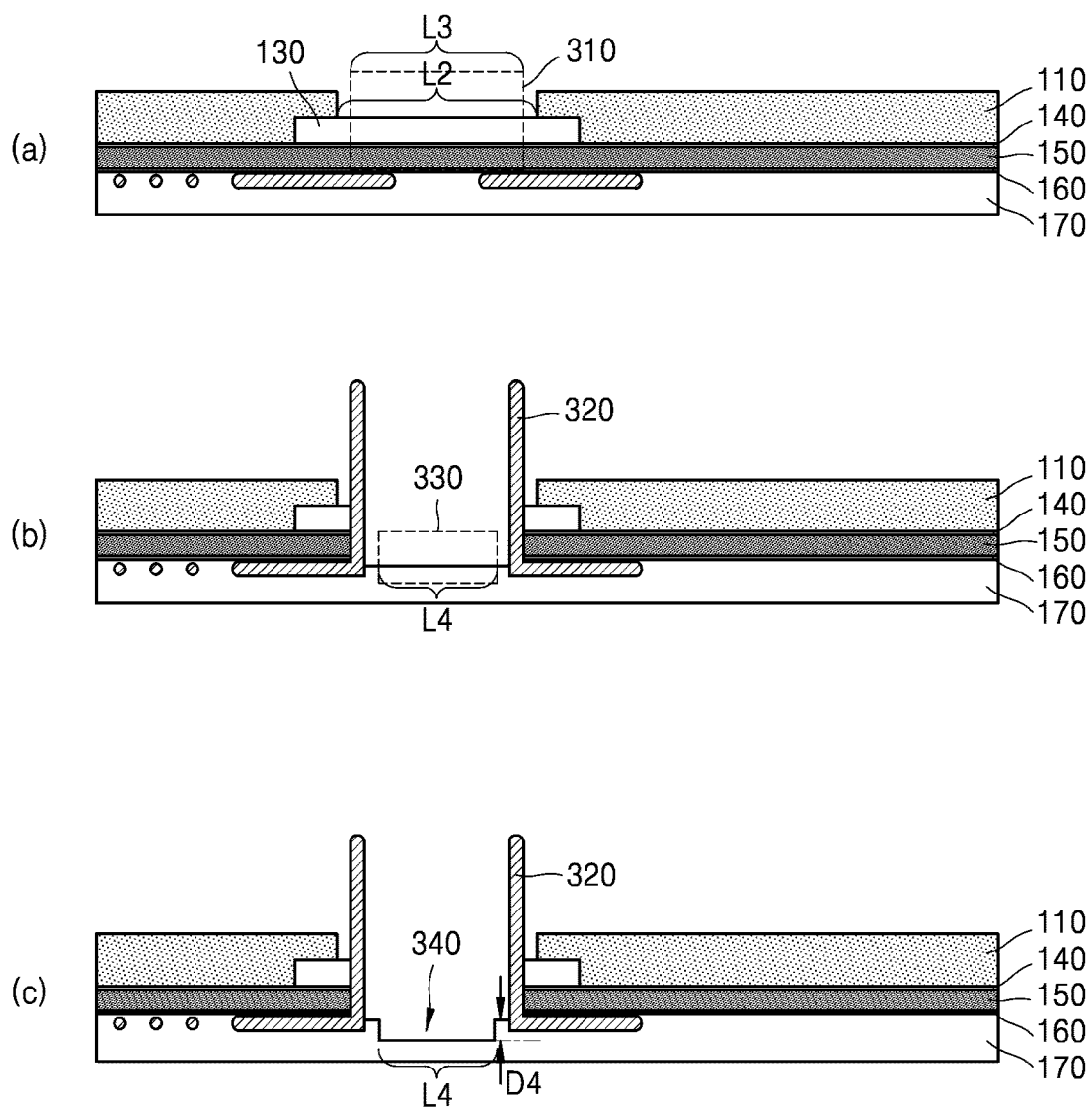

FIGS. 4 to 5 are sectional views showing a metal card manufacturing method according to an embodiment of the present invention. FIG. 4 (a) to (c) show a method for machining the metal sheet 110 to thus attach the machined part 130 to the metal sheet 110. Referring to FIG. 4(a), first, a machined part insertion space 210 (for example, having a width L1 and a depth D1) into which the machined part 130 is insertable is formed on the metal sheet 110. According to the present invention, the machined part insertion space 210 is formed through CNC machining. Next, as shown in FIG. 4(b), the machined part 130 made of the plastic material like PVC is inserted into the machined part insertion space 210 of the metal sheet 110. In this case, the machined part 130 is inserted, without any separate adhesive. After that, the opposite side metal sheet 110 to the machined part 130 is machined to form a machined part exposure portion 230 from which the machined part 130 is exposed. At this time, a width L2 of the machined part exposure portion 230 has to be smaller than the width L1 of the machined part insertion space 210. This is to prevent the machined part 130 from being separated from the metal sheet 110 at the time when the metal sheet 110 turns over later.

FIG. 5 (a) to (c) show a second machining process for the machined part 130 after the machined part 130 has been inserted into the metal sheet 110 and the metal sheet 110 has been then laminated onto the sheets 140 to 170. According to the present invention, the machined part 130 is mounted onto the metal sheet 110, and after that, the metal sheet 110, the adhesive sheet 140, the insulating sheet 150, the adhesive sheet 160, and the inlay sheet 170 are laminated on each other. Even though not shown in the drawings, a printed sheet and a magnetic strip MS overlay sheet may be laminatedly bonded to the underside surface of the inlay sheet 170.

The card body laminated is provided as shown in FIG. 5(a). The metal sheet 110 located on the topmost sheet of the metal card is provided with the machined part exposure portion 230 having the width L2. In this state, second CNC machining is carried out. As shown in FIG. 5(a), the sheets are machined up to the inlay sheet 170 to a width L3 to form an insertion space 310. In this case, the laminated sheets are finely machined to the width L3 until the antenna coils 320 of the inlay sheet 170 are exposed. If the antenna coils 320 of the inlay sheet 170 are exposed, the antenna coils 320 are lifted upward, as shown in FIG. 5(b). Even in this case, the sides of the machined part 130 are exposed by the insertion space 310, so that the antenna coils 320 are just exposed to the sides of the adhesive sheets 140 and 160, the insulating sheet 150, and the machined part 130, but they do not come into direct contact with the metal sheet 110. Through such machining, the antenna coils do not come into direct contact with the metal material.

Next, as shown in FIG. 5(b), the machined part exposure portion 230 is machined one more time to form a given space 330 for accommodating the underside surface of the COB pad and to achieve flattening on the top surface of the metal card. In this case, the inlay sheet 170 is machined to a width L4 to insert a protruding portion from the underside surface of the COB pad. In this case, the width L4 is smaller than the width L3. If the second milling for the insertion of the COB pad is finished, as shown in FIG. 5(c), an accommodation recess 340 is formed to insert the COB pad. After that, the antenna coils 320 lifted upward are connected with the contact points of the COB pad by means of spot welding, and the COB pad is mounted into the accommodation recess 340. According to the present invention, the COB pad insertion process may be carried out after the top surface of the metal card has been printed and coated.

Figure 6:
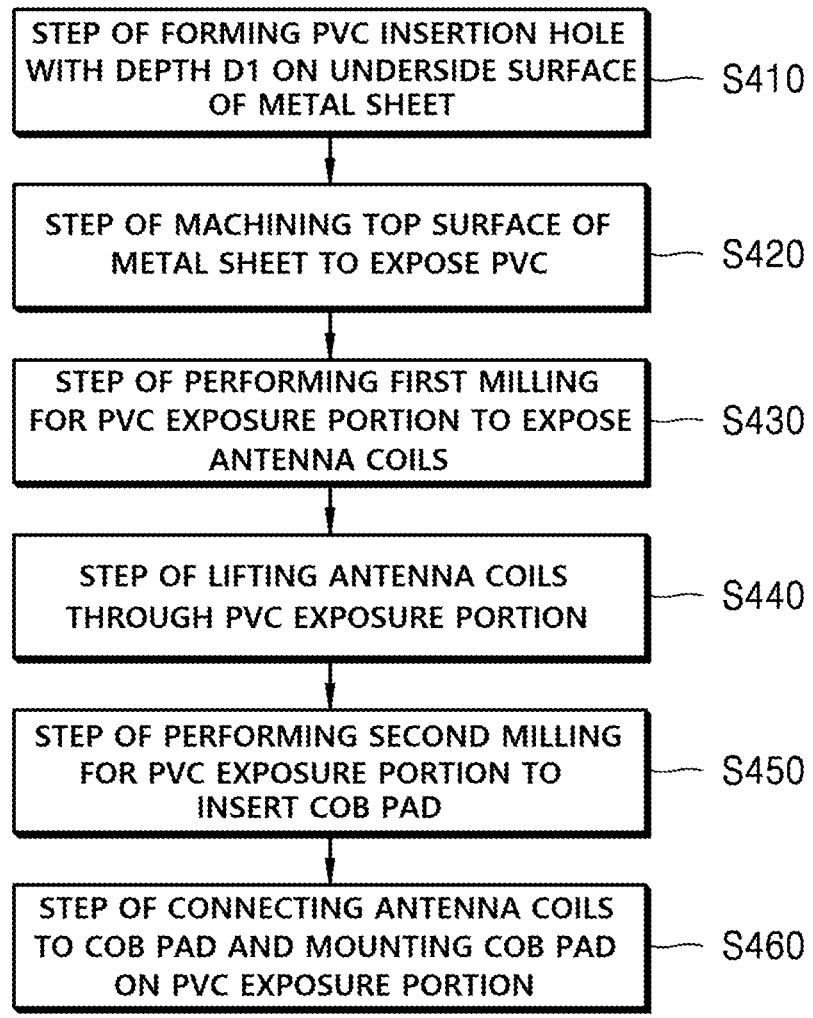
FIG. 6 is a flowchart showing the metal card manufacturing method according to the present invention.

FIG. 6 is a flowchart showing the metal card manufacturing method according to the present invention. In the metal card manufacturing method according to the present invention, the processes for forming the machined part 130 on the metal sheet 110 and mounting the COB pad onto the metal sheet 110 will be focusedly explained.

First, the machined part insertion space 210 is formed on one surface (for example, the underside surface) of the metal sheet 110 (at step S410). The machined part insertion space 210 serves to insert the machined part 130 made of the plastic material like PVC, which is also referred to as PVC insertion space. According to an embodiment of the present invention, the depth of the machined part insertion space 210 is ½ of the thickness of the entire metal sheet. Specifically, the depth D1 of the machined part insertion space 210 is ½ of the thickness D of the metal sheet. The machined part insertion space 210 has the shape of a square with the length L1 larger than a length of one surface of the COB pad. If the formation of the machined part insertion space 210 is finished, the machined part 130 is inserted into the machined part insertion space 210.

Next, the other surface (for example, the top surface) of the metal sheet 110 is cut to form the machined part exposure portion 230 from which the machined part 130 is exposed (at step S420). In this case, the cut area has the shape of a square with the length L2 smaller than the length L1 of one side of the machined part insertion space 210 (L2<L1). This is to prevent the machined part 130 inserted into the machined part insertion space 210 from being separated from the metal sheet 110. As mentioned above, the machined part 130 is mounted onto the metal sheet 110 and is then laminatedly bonded to other sheets. After the laminating process, the metal sheet 110, the machined part 130, the adhesive sheets 140 and 160, the insulating sheet 150, the inlay sheet 170, and the printed sheet 190 are all bonded to the form of one card body (See FIG. 5(a)).

Through the first milling process on the laminated sheets, the antenna coils 320 are lifted upward from the inlay sheet 170 (at steps S430 and S440). As explained with reference to FIG. 5(a), the first milling process is carried out to place the machined part 130 to be exposedly in an upward direction with respect to other sheets bonded to the metal sheet 110 on which the machined part 130 is mounted. Specifically, the metal sheet 110 is located on the topmost position, and in the state where the machined part 130 made of the plastic material like PVC is exposed through the machined part exposure portion 230 with the length L2, the sheets are cut up to the inlay sheet 170 through the first milling process. At this time, the cut area has the shape of a square (or circle) with one side length L3 smaller than the length L2 (L3<L2). Since the sheets are cut to have the area with the length L3 smaller than the length L2, the metal sheet 110 can be spaced apart from the COB pad insertion space 310 through the first milling process. As the given distance between the metal sheet 110 and the COB pad insertion space 310 is formed, the antenna coils 320 do not come into contact with the metal sheet 110 even though they are lifted upward.

Next, the second milling process is carried out to insert the COB pad 350, and in the second milling process, the COB pad insertion space 310 is cut one more time to form the accommodation recess 340 (at step S450). According to the present invention, the second milling process is carried out before primer application, printing and coating onto the top surface of the metal card, and otherwise, it may be carried out after the primer application, printing and coating onto the top surface of the metal card. In this case, the COB pad to which a semiconductor for a smart card is attached is assembled to an information transmission and near field communication package. The second milling process is carried out to form the space for accommodating the area protruding from the underside surface of the COB pad, so that a portion of the open portion of the inlay sheet 170 is cut to the accommodation space 340 (for example, to the shape of a square with one side length L4) with the length L4 and a depth D4 (See FIG. 5(c)). One or more contact points (contact portions) to be connected to the antenna coils 320 are formed on the underside surface of the COB pad, and the antenna coils 320 lifted upward through the COB pad insertion space 310 are directly connected to the contact points of the underside surface of the COB pad.

According to the present invention, as shown in FIG. 5 (a) to (c), the two antenna coils 320 lifted upward are connected correspondingly to the contact points of the underside surface of the COB pad, and after that, the COB pad is inserted into the COB pad insertion space 310 of the metal sheet 110. In this case, an adhesive or adhesion sheet is added to the underside surface of the COB pad, and then, the COB pad is fixedly inserted into the COB pad insertion space 310 of the metal sheet 110.

Through such process, the antenna coils 320 are connected directly to the COB pad in the state of being not brought into direct contact with the metal sheet 110, thereby manufacturing the metal card capable of keeping the characteristics of the metal material and improving a contactless communication function. Specifically, the COB pad and the antenna coils are directly connected to each other, while the top surface of the metal card is being made of the metal material, so that unlike the existing metal card, the wireless communication sensitivity is improved and no interference between the metal material and the antenna coils occurs.

Figure 7:
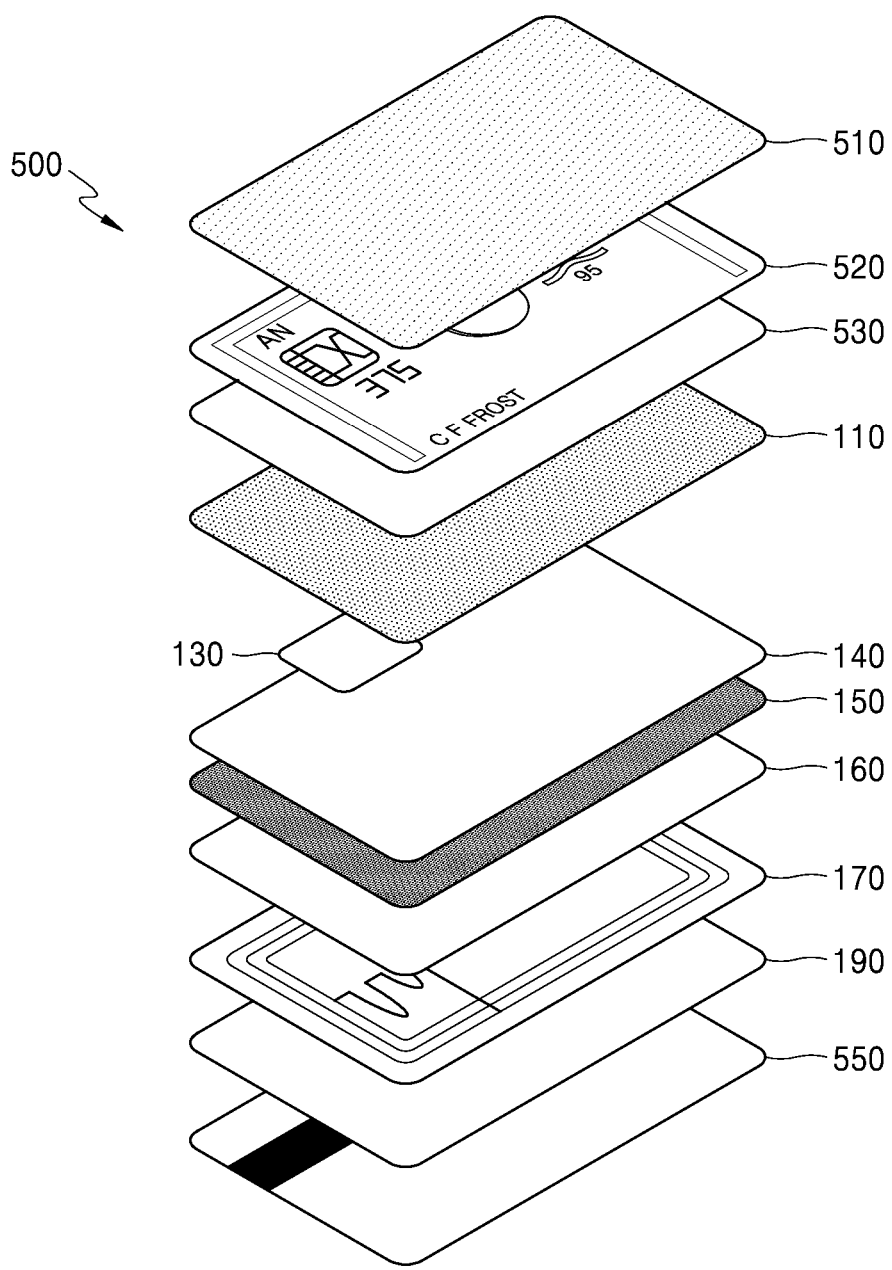
FIG. 7 is a perspective view showing a metal card according to still another embodiment of the present invention.

FIG. 7 is a perspective view showing a metal card according to still another embodiment of the present invention. According to still another embodiment of the present invention, the metal card 500 is configured to additionally provide a primer sheet 530, a three dimensional printed sheet 520, and a coated sheet 520 onto the metal card body with the machined part 130. Even though not shown in the figure, a C-cut process for grinding the corners of the card and a stamping process for attaching a signature panel and a hologram to the underside surface of the card may be carried out additionally to make the metal card 500.

As described above, the metal card 500 includes one or more sheets or layers. According to still another embodiment of the present invention, the metal card 500 includes a metal sheet 110, a plastic machined part 130, an insulating sheet 150, one or more adhesive sheets 140 and 160, an inlay sheet 170, a printed sheet 190, and a magnetic strip overlay sheet 550. In FIG. 7, the metal card 500 includes only the components as mentioned above, and it may further include a COB pad, and other components, without being limited thereto. According to the present invention, further, the metal card 500 is manufactured to a given size and thickness according to predefined standards, and the sizes and thicknesses of the respective sheets are determined optimizedly in consideration of the operation and wireless communication sensitivity of the metal card. Furthermore, the sheets constituting the metal card 500 according to the present invention are not the sheets for making one card, but they are the large-scale sheets for making a plurality of cards so as to achieve mass production of the cards. First, the sheets are laminated on one another and are then machined, thereby making the plurality of cards. According to the characteristics of the metal material, a special machining material, a coolant, and a cutting tool are used to perform the machining operation for the metal sheet 110.

The metal sheet 110 of the metal card 500 is a core sheet expressing special material and weight of the metal card of the present invention and is made of an SUS (Steel Use Stainless) material. The metal material constituting the metal sheet 110 is selected in consideration of the material and weight expressing the characteristics thereof as well as durability, abrasion, and deformation with which machining processes are resistant.

The machined part 130 is a piece of sheet made of a plastic material like PVC with given thickness and size and is disposed in a machined part insertion space of the metal sheet 110. The machined part 130 serves as a device for attaching antenna coils of the inlay sheet 170 to the COB pad in such a manner as to be spaced apart from the metal sheet 110 according to the characteristics of the metal card 5100. The machined part 130 made of the plastic material is located on a given portion of the metal sheet 110 and is then machined, so that the COB pad can be efficiently connected to the antenna coils, while a direct contact between the metal sheet 110 and the antenna coils is being avoided.

The insulating sheet 150 serves to shield an interference with the metal sheet 110 so as to allow the antenna coils of the inlay sheet 170 to be operable. So as to eliminate eddy, a high permeability and high resistance material is located between the metal and the antenna coils to adjust magnetic field lines. To do this, a ferrite sheet is used as the insulating sheet 150. The insulating sheet 150 and the metal sheet 110 are bonded to each other by means of the adhesive sheets 140 and 160. According to an embodiment of the present invention, the adhesive sheets 140 and 160 are hot melt sheets. A hot melt material is melted by means of heating, and if a material like a thermoplastic resin is heated, melted and then cooled, it becomes solidified. Accordingly, the thermoplastic resin material can be used as a film type hot melt adhesive.

The inlay sheet 170 is a sheet having the RF antenna coils, and the number of turns of the antenna coils in the inlay sheet 170 is determined to express optimized sensitivity through an RF communication (for example, NFC) sensitivity test. According to the present invention, further, the antenna coils are directly connected to the COB (Chip-On-Board) pad attached to the metal sheet 110 through the machined part 130.

The printed sheet 190 is a sheet on which card information or an image like a pattern is printed and displayed, which is attached to the underside surface of the metal card 100. The magnetic strip overlay sheet 550 is a sheet on which a magnetic strip is located.

The respective sheets are bonded and laminated on one another to the form of one card body according to a predetermined way. After that, the large-scale sheet made to the form of one integrated sheet is machined through a CNC cutting tool, thereby producing individual cards therefrom.

Next, the cards separated as individual cards are subjected to a primer application process, a 3-D printing process, and a coating process. According to an embodiment of the present invention, the laminatedly integrated sheets are separated as individual cards through the CNC cutting process, and the primer is applied to the separated cards. In this case, the primer is selected from materials capable of improving the preservation force of the printed information according to the material of the metal sheet. Next, card information, pattern, and picture image are formed engravedly on the metal sheet onto which the primer is coated through the 3-D printing process. After that, the coating process is carried out to form the coated sheet 510 on the topmost surface of the metal card, so that the information formed through the 3-D printing process is not worn or removed.

As mentioned above, the second milling process in which the COB pad is inserted is carried out before the primer application process and the printing process, and so as to prevent the COB pad from being contaminated by the primer or coating material, otherwise, the second milling process may be carried out before the insertion of the COB pad after the coated sheet has been formed.

According to the present invention, since the top surface of the metal sheet 110 is formed of the metal material, together with the primer sheet 530, the three dimensional printed sheet 520, and the coated sheet 520, the metal card can have a high level outer appearance, while providing the card information. Also, the machined part 130 made of the plastic material is insertedly located on the COB pad insertion space of the metal sheet 110, and the antenna coils are connected directly to the COB pad through the machined part 130, without any contact with the metal sheet 110. Through the metal card manufacturing method according to the present invention, the top surface of the card is formed of the metal material, while the sensitivity of the antenna coils is being improved, thereby keeping the high level outer appearance of the metal card and improving the wireless communication function.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention. For example, each singular component may be dispersed, and also, the components dispersed may be coupled to each other.

It is therefore intended that the scope of the invention be limited not by this detailed description, but rather by the claims appended hereto. It is to be appreciated that those skilled in the art can change or modify the embodiments without departing from the scope and spirit of the present invention.

The invention claimed is:

1. A metal card comprising:
    a metal sheet having a first side and a second side;
    a machined part made of a plastic material;
    an inlay sheet having antenna coils; and
    an insulating sheet made of a ferromagnetic insulating material, the insulating sheet interposed between the inlay sheet and the first side of the metal sheet;
        wherein the metal sheet has a machined part insertion portion formed on the first side to accommodate the machined part, and the ferromagnetic insulating material has a shape of one or more pieces, and
        wherein a first opening is defined on the second side of the metal sheet, exposing a portion of the machined part therethrough, wherein a part of the portion of the machined part and insulating sheet have a second opening which is connected to the first opening and
        wherein the antenna coils are exposed outside through the second opening and connected to a COB (Chip-On-Board) pad, which is attached to the first opening of the metal sheet.

2. The metal card according to claim 1, wherein the ferromagnetic insulating material is a ferrite.

3. The metal card according to claim 1, wherein the inlay sheet has an accommodation recess adapted to accommodate a protruding portion of the COB pad.

4. The metal card according to claim 1, further comprising one or more adhesive sheets as hot melt sheets configured to attach the insulating sheet,
    wherein the adhesive sheets are melted at a high temperature and are penetrated into gaps between one or more pieces of the ferromagnetic insulating material.

5. The metal card according to claim 1, further comprising:
    a primer sheet applied to the metal sheet where the COB pad is attached;
    a printed sheet configured to print card information and formed on the metal sheet where the primer sheet is applied; and
    a coated sheet configured to coat the metal sheet and formed on the metal sheet where the card information is printed.

6. A metal card comprising:
    a metal sheet having a first side and a second side;
    a machined part made of a plastic material;
    an inlay sheet having antenna coils; and
    an insulating sheet made of a ferromagnetic insulating material, the insulating sheet interposed between the inlay sheet and the first side of the metal sheet;
        wherein the metal sheet has a machined part insertion portion formed on the first side to accommodate the machined part, and the ferromagnetic insulating material has a shape of powder, and
        wherein a first opening is defined on the second side of the metal sheet exposing a portion of the machined part therethrough, wherein a part of the portion of the machined part and insulating sheet have a second opening which is connected to the first opening and
        wherein the antenna coils are exposed outside through the second opening and connected to a COB (Chip-On-Board) pad, which is attached onto the first opening of the metal sheet.

7. The metal card according to claim 6, further comprising:
    a primer sheet applied to the metal sheet where the COB pad is attached;
    a printed sheet configured to print card information and formed on the metal sheet where the primer sheet is applied; and
    a coated sheet configured to coat the metal sheet and formed on the metal sheet where the card information is printed.

8. A card manufacturing method for manufacturing a card with a metal sheet, a machined part, an insulating sheet, and an inlay sheet, the method comprising the steps of:—
    inserting the machined part made of a plastic material into one surface of the metal sheet to provide the metal sheet with the machined part;
    attaching the insulating sheet made of a ferromagnetic insulating material to an opposite surface of the metal sheet;
    attaching the inlay sheet with antenna coils to one side surface of the insulating sheet,
        wherein the metal sheet, the insulating sheet, and the inlay sheet are attached to one another by one or more adhesive sheets, and the ferromagnetic insulating material has a shape of one or more pieces, and
        wherein the step of providing the metal sheet with the machined part comprises the steps of:
            forming a machined part insertion portion on the one side surface of the metal sheet,
            inserting the machined part made of the plastic material into the machined part insertion portion,
            forming a first opening of the metal sheet on the opposite side surface to one side surface thereof to expose a portion of the machined part therethrough, and
            performing a first milling process for the machined part and sheets laminated on the opposite side surface of the metal sheet through the first opening of the metal sheet;
    connecting the antenna coils exposed through the first milling process to a COB (Chip-On-Board) pad; and
    attaching the COB pad connected to the antenna coils onto the first opening of the metal sheet.

9. The method according to claim 8, wherein in the step of forming the first opening, the metal sheet is cut until the machined part made of the plastic material is exposed.

10. The method according to claim 9, further comprising the step of performing a second milling process for a portion of the inlay sheet exposed through the first milling process to insert the COB pad, the second milling process forming an accommodation recess adapted to accommodate a protruding portion of the COB pad.

11. The method according to claim 10, further comprising the steps of:
    applying a primer onto the metal sheet where the COB pad is attached;
    printing card information on the metal sheet where the primer is applied; and coating the metal sheet where the card information is printed.

12. The method according to claim 8, wherein the ferromagnetic insulating material is a ferrite.

13. The method according to claim 8, wherein one or more adhesive sheets as hot melt sheets are provided to attach the insulating sheet thereto, and
wherein the adhesive sheets are melted at a high temperature and are penetrated into gaps between one or more pieces of the ferromagnetic insulating material to attach them.

14. A card manufacturing method for manufacturing a card with a metal sheet, a machined part, an insulating sheet, and an inlay sheet, the method comprising the steps of:
inserting the machined part made of a plastic material into one surface of the metal sheet to provide the metal sheet with the machined part;
attaching the insulating sheet made of a ferromagnetic insulating material to an opposite surface of the metal sheet; and
attaching the inlay sheet with antenna coils to one side surface of the insulating sheet,
wherein the metal sheet, the insulating sheet, and the inlay sheet are attached to one another by one or more adhesive sheets, and the ferromagnetic insulating material has a shape of powder, and
wherein the step of providing the metal sheet with the machined part comprises the steps of:
forming a machined part insertion portion on one side surface of the metal sheet,
inserting the machined part made of the plastic material into the machined part insertion portion,
forming a first opening of the metal sheet on the opposite side surface to one side surface thereof to expose a portion of the machined part therethrough, and
performing a first milling process for the machined part and the sheets laminated on the underside of the metal sheet through the first opening of the metal sheet;
connecting the antenna coils exposed through the first milling process to a COB (Chip-On-Board) pad; and
attaching the COB pad connected to the antenna coils onto the first opening of the metal sheet.

* * * * *